(12) United States Patent
Gattani

(10) Patent No.: US 10,122,620 B2
(45) Date of Patent: Nov. 6, 2018

(54) METHOD AND SYSTEM FOR PROGRAMMING EQUAL-COST MULTI-PATH ROUTES ON NETWORK DEVICES

(71) Applicant: Arista Networks, Inc., Santa Clara, CA (US)

(72) Inventor: Akshay Gattani, Sunnyvale, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/697,123

(22) Filed: Sep. 6, 2017

(65) Prior Publication Data

US 2017/0366450 A1   Dec. 21, 2017

Related U.S. Application Data

(63) Continuation of application No. 14/724,686, filed on May 28, 2015, now Pat. No. 9,787,575.

(51) Int. Cl.
| | |
|---|---|
| *H04L 12/707* | (2013.01) |
| *H04L 12/24* | (2006.01) |
| *H04L 12/741* | (2013.01) |
| *H04L 12/727* | (2013.01) |

(52) U.S. Cl.
CPC .......... *H04L 45/24* (2013.01); *H04L 41/0813* (2013.01); *H04L 45/121* (2013.01); *H04L 45/745* (2013.01)

(58) Field of Classification Search
CPC ..... H04L 45/24; H04L 45/121; H04L 45/745; H04L 41/0813
See application file for complete search history.

(56) References Cited

U.S. PATENT DOCUMENTS

| | | |
|---|---|---|
| 8,139,492 B1 | 3/2012 | Peterson et al. |
| 8,995,301 B1 | 3/2015 | Miller et al. |
| 2004/0264380 A1 | 12/2004 | Kalkunte et al. |
| 2014/0254592 A1 | 9/2014 | Olofsson et al. |
| 2015/0263899 A1 | 9/2015 | Tubaltsev et al. |
| 2015/0263974 A1 | 9/2015 | Ortacdag et al. |
| 2016/0241463 A1 | 8/2016 | D'Souza et al. |
| 2016/0294612 A1 | 10/2016 | Ravinoothala et al. |

*Primary Examiner* — Habte Mered
(74) *Attorney, Agent, or Firm* — Chamberlain, Hrdlicka, White, Williams & Aughtry

(57) ABSTRACT

A method for configuring a network device. The method includes writing a route for a destination IP prefix to the forwarding information base (FIB), and after writing the route, obtaining a set of routes and Writing the set of routes to a routing information base (RIB). The method further includes, after writing the set of routes to the RIB and after the expiration of a timer: identifying, in the RIB, a set of ECMP routes from the plurality of routes for the destination IP prefix, processing the set of ECMP routes for the destination IP prefix, and updating the FIB of the network device based on set of processed ECMP routes.

17 Claims, 7 Drawing Sheets

METHOD AND SYSTEM FOR PROGRAMMING EQUAL-COST MULTI-PATH ROUTES ON NETWORK DEVICES

CROSS REFERENCE TO RELATED APPLICATIONS

This application is a continuation application of U.S. patent application Ser. No. 14/724,686, filed on May 28, 2015, and entitled: "Method and System for Programming Equal-Cost Multi-Path Routes on Network Devices." According, this application claims benefit of U.S. patent application Ser. No. 14/724,686 under 35 U.S.C. § 120. U.S. patent application Ser. No. 14/724,686 is here by incorporated by reference in its entirety.

BACKGROUND

Border network devices such as routers or multilayer switches are network devices that are used to manage the flow of data between different segments of a network. Border network devices may use Equal-Cost Multi-Path (ECMP) routing to transmit packages via multiple paths.

SUMMARY

In general, in one aspect, the invention relates to a method for configuring a network device. The method includes writing a route for a destination IP prefix to the forwarding information base (FIB), and after writing the route, obtaining a set of routes and writing the set of routes to a routing information base (RIB). The method further includes, after writing the set of routes to the RIB and after the expiration of a timer: identifying, in the RIB, a set of ECMP routes from the plurality of routes for the destination EP prefix, processing the set of ECMP routes for the destination IP prefix, and updating the FIB of the network device based on set of processed ECMP routes.

In general, in one aspect, the invention relates to a non-transitory computer readable medium including instructions that enable a network device to write a route for a destination IP prefix to the forwarding information base (FIB), and after writing the route, obtain a set of routes and write the set of routes to a routing information base (RIB). The instructions further enable the network device to identify, in the RIB, a set of ECMP routes from the plurality of routes for the destination IP prefix, process the set of ECMP routes for the destination IP prefix, and update the FIB of the network device based on set of processed ECMP routes, after writing the set of routes to the RIB and after the expiration of a timer.

In general, in one aspect, the invention relates to a network device that includes a routing information base (RIB) and a forwarding information base (FIB). The network device writes a route for the destination IP prefix to the forwarding information base (FIB), and after writing the route, obtains a set of routes and writes the set of routes to the RIB. The network device further identifies, in the RIB, a set of ECMP routes from the set of routes for the destination IP prefix, processes the set of ECMP routes for the destination IP prefix, and updates the FIB based on set of processed ECMP routes, after writing the plurality of routes to the RIB and after the expiration of a timer.

Other aspects of the invention will be apparent from the following description and the appended claims.

DETAILED DESCRIPTION

Figure 1:
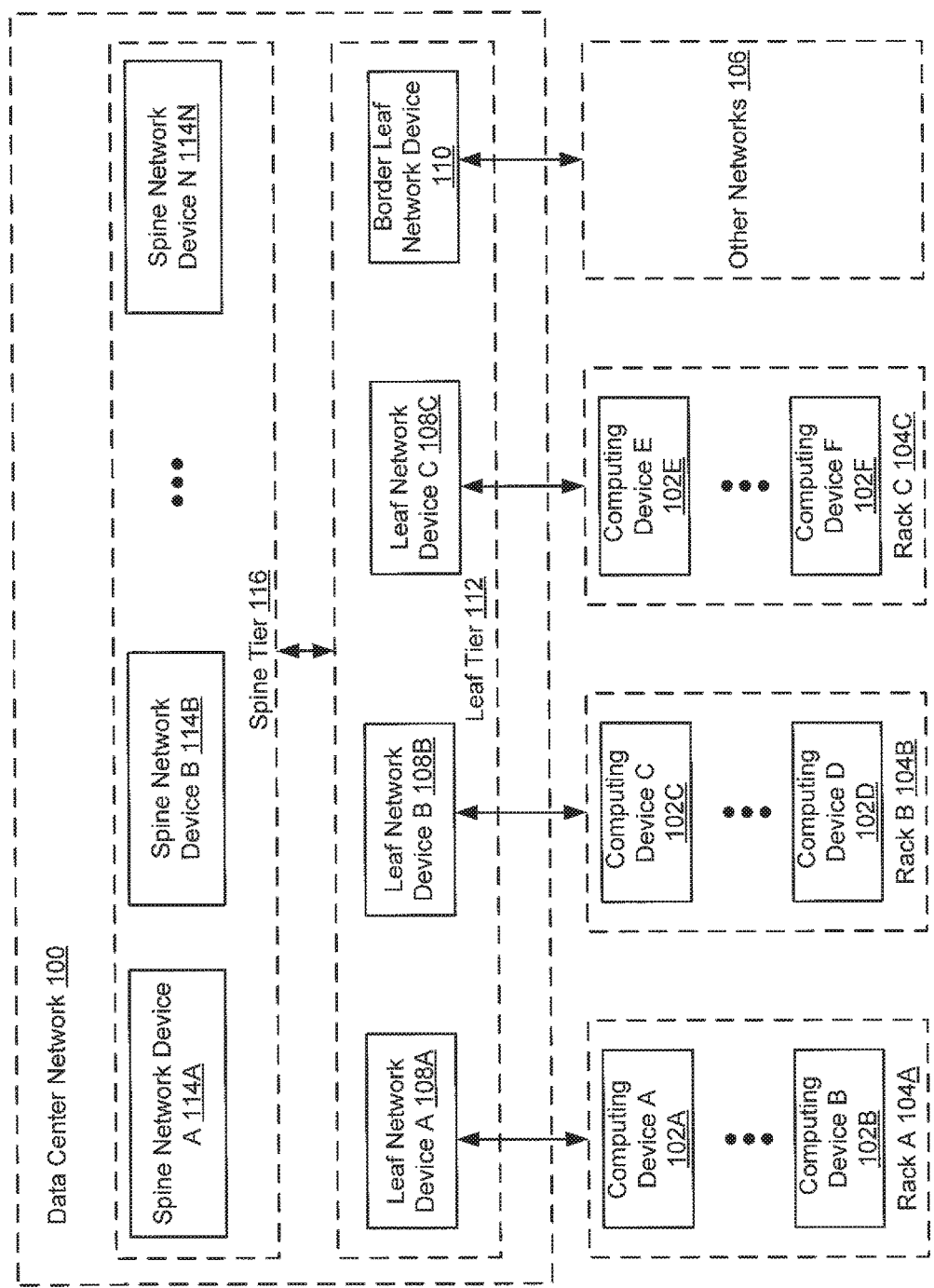
FIG. 1 shows a network that includes network devices in accordance with one more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to configuring a network device to perform routing of data packets in a network. More specifically, one or more embodiments of the invention include the configuration of Equal Cost Multi-Path (ECMP) routing in conjunction with the Border Gateway Protocol (BGP) on the network device. ECMP routing is a strategy where multiple data paths to the same destination may be used by a network device to forward data packets to the destination. Accordingly, ECMP routes may provide increased bandwidth in comparison to a single route in eases where multiple data packets are simultaneously sent to the same destination. Further, ECMP routes may provide superior reliability due to the inherent redundancy of the ECMP routes. In one or more embodiments of the invention, the network device may establish BGP sessions with peer BGP network devices, i.e. it may connect to other BGP-capable network devices. During a convergence phase, the network device may receive route updates, i.e. information about available routes to network destinations, from some or all of the peer BGP network devices with which the network device has established BGP sessions. The network device may add the received route updates to a routing information base (RIB). Subsequently, the network device may identify a group of routes suitable for ECMP routing and may process the identified group of routes before writing them to a forwarding information base (FIB), where they may be used to perform ECMP routing of incoming data packets. In one embodiment of the invention, the processing of ECMP routes may be delayed until sufficient route updates have been received from the peer network devices, thereby avoiding potentially repetitive processing of ECMP routes, as further described in detail below.

The following description describes some embodiments of the invention in which the network devices are routers. However, the invention is not limited to routers; rather embodiments of the invention may be extended to include other network devices (e.g. multi-layer switches).

FIG. 1 shows a network that includes network devices in accordance with one or more embodiments of the invention. In one embodiment of the invention, the network (100) may connect to computing devices (102A-102F) that may be housed in racks (104A-104C). The network (100) may be organized hierarchically. For example, a leaf tier (112) may include leaf network devices (108A-108C), and a spine tier (116) may include spine network devices (114A-114N). In addition, the network (100) may include a border leaf network device (110) that may connect the network (100) to other networks (106). Each of these components is described below.

In one or more embodiments of the invention, the network (100) includes a set of network devices (108A-108C, 110, 114A-114N) that are configured to act in concert to provide a connection for the exchange of data packets between the computing devices (102A-102F) and/or between the computing devices (102A-102F) and other computing devices outside of the network (not shown).

In one embodiment of the invention, the computing devices (102A-102F), housed in racks (104A-104C), may be servers. A server may include a processor, memory, and one or more physical network interfaces. Examples of types of servers include, but are not limited to, Dynamic Host Configuration Protocol (DHCP) servers, database servers, application servers, file servers, print servers, and mail servers. At least one network interface of a server connects the server to the network (100) via a leaf network device (108A-108C).

In one or more embodiments of the invention, the leaf network devices (108A-108C) are organized in the leaf tier (112). The leaf tier (112) forms an access layer with connections to the computing devices (102A-102F), and connections to the spine network devices (114A-114N) in the spine tier (116). The aforementioned connections enable packets to be communicated between computing devices (102A-102F) located in different racks (104A-104C), for example, between computing device A (102A) in rack A (104A) and computing device F (102F) in rack C (104C), via leaf network device A (108A), spine network devices A-N (114A-114N), and leaf network device C (108C). Accordingly, multiple redundant paths exist for a computing device to communicate with another computing device. Assuming, for example, that the spine tier includes only two spine network devices (114A and 114B), two redundant paths may exist, whereas assuming that the spine tier includes eight spine network devices (114A-114H), eight redundant paths may exist, etc. The border network device (110) organized in the leaf tier (112) may provide an interface to external networks (106), enabling, for example, access to the servers (102A-102F) from a workstation (not shown) located outside the network (100).

In one or more embodiments of the invention, the leaf network devices (108A-108C), the spine network devices (114A-114B), and the border leaf network device (110) may be, for example, routers or multi-layer switches configured to perform various switching functions (e.g., layer 2 functions) and routing functions, e.g., layer 3 functions and functions described in FIGS. 3-7

One skilled in the art will recognize that the architecture of a network is not limited to the components shown in FIG. 1. For example, the network may include additional autonomous systems of a wide range of size and complexity. Network devices using BGP may be used to connect autonomous systems and/or to connect other network devices and/or computing devices within. autonomous systems, without departing from the invention.

Figure 2:
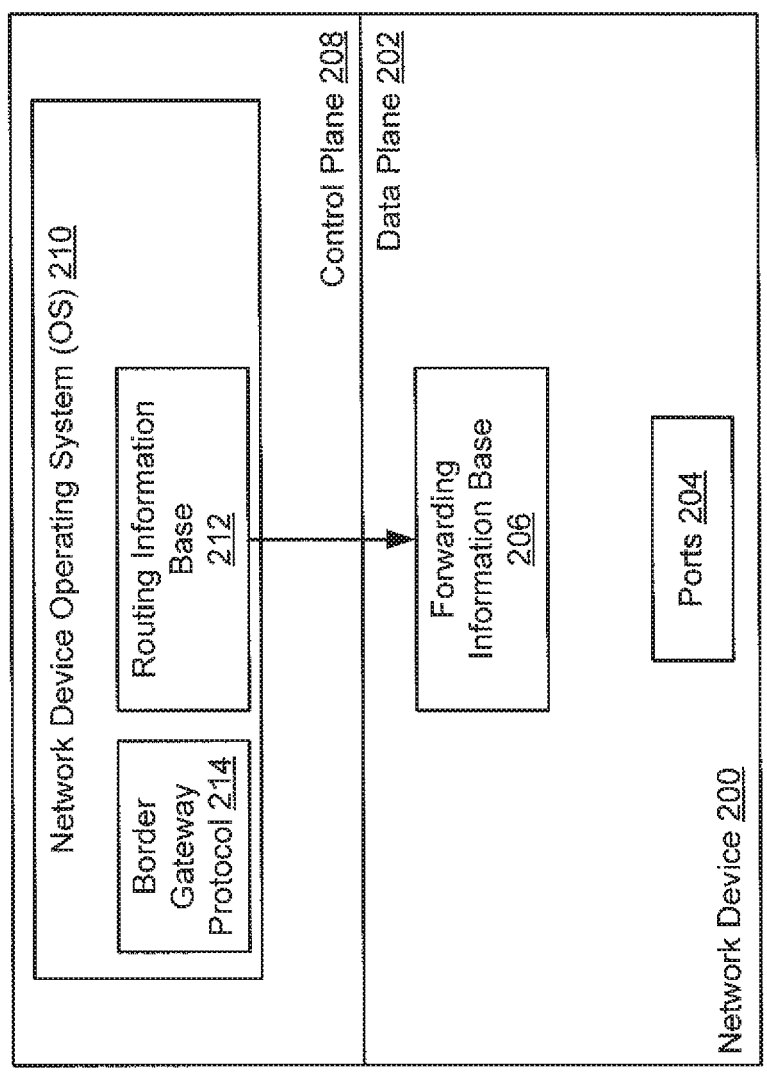
FIG. 2 shows a network device in accordance with one or more embodiments of the invention.

FIG. 2 shows a network device (200) in accordance with one or more embodiments of the invention. In one embodiment of the invention, the network device (200) may include ports (204), and a forwarding information base (FIB) (206) organized in a data plane (202). A network device in accordance with one or more embodiments of the invention may further include a network device operating system (OS) (210) in a control plane (208). The network device OS (210) is software that manages the hardware of the network device to provide functionality to the network device (e.g., functionality to implement methods shown in FIGS. 3-4) and may be executed on a processor (not shown). The network device OS (210) may host an implementation of the border gateway protocol (BGP) (214) and may implement a routing information base (RIB) (212). Each of these components is described below.

In one or more embodiments of the invention, the ports (204) of the network device (200) provide the physical interfaces to other network devices or computing devices (not shown). Incoming packets may be received by the network device (200) via the ports (204), and outgoing packets may be sent by the network device (200) via the ports (204). The network device is configured to process packets hi accordance with one or more embodiments of the invention. The forwarding information base (FIB) (206) is a hardware-implemented database containing the route entries to be used by the network device for making routing decisions. In one or more embodiments of the invention, route entries in the FIB (206) may include ECMP routes. In one or more embodiments of the invention, processing a packet may include receiving a packet via a port (204), extracting packet destination information from the packet header of the received packet, searching the FIB (206) for a suitable route to the destination, and sending the packet, via a port (204), to the next hop network device, i.e. the next network device in the chain of network devices forming the route to the destination.

In one or more embodiments of the invention, the route entries in the FIB (206) may be programmed by the network device OS (210), based on route entries stored in the routing information base (RIB) (212). The network device OS (210) may use the RIB (212) for storing all available routing information. Routing protocols such as, for example, the border gateway protocol (BGP) may be used to receive routes received from a peer network device via a route update. The received routes may be stored in the RIB (212). The network device OS (210) may select a set of routes to be used for routing from the routes stored in the RIB, and may write the selected routes to the FIB (206). In one or more embodiments of the invention, the routes selected by the network OS (210) include ECMP routes. A complete set of routes may be written to the FIB (206) during network device initialization, for example, after powering on the network device. Further, the FIB (206) may be updated periodically by writing or deleting complete sets of routes, individual route entries, or groups of routes while the network device is operating.

In one or more embodiments of the invention, the RIB (212) is populated with routes preprogrammed into the network device (200), complemented by routes received from peer network devices (not shown). The network device (200) may receive routes from peer network devices by exchanging route updates with the peer network devices using, for example, the border gateway protocol (BGP) (214), or other protocols suitable for exchanging routing and reachability information.

One skilled in the art will recognize that the architecture of a network device is not limited to the components shown in FIG. 2. For example, the network device may include network chips, processors and memory riot shown in FIG. 2.

In one or more embodiments of the invention, the network device uses the border gateway protocol (BGP) to communicate with peer BGP network devices. BGP is a standardized protocol, described by the IETF document RFC 4271, designed to exchange routing and reachability information between network devices. When a network device powers on, the network device's knowledge about the surrounding network infrastructure and available routes may be limited to the information stored in the network device's routing information base (RIB). The RIB may include information about the topology of the network surrounding the network device, the routes to network destinations, next-hop information, and metrics related to the routes. Next hop information may include the IP address of the next network device to which a packet is to be transmitted (i.e., sent) on the route toward the destination of the packet. Metrics may include, but are not limited to, information related to the route the packet may take towards its destination and may be represented by numerical values representative of the "cost" of the route. However, the RIB of the network device may be incomplete. For example, there may be no routing information for certain IP prefixes (i.e., destination IP address ranges), and/or the cost of the routes stored in the network device's RIB may be higher than necessary, i.e. shorter routes, requiring fewer "hops" to a destination may exist but are not stored in the RIB. Further, the network device may not be aware of available redundant paths that may be suitable for ECMP routing. Therefore, when BGP is started on the network device, for example due to an initial boot of the network device, or in response to a command instructing the network device to restart BGP the network device according to one or more embodiments of the invention, gathers routing information from peer BGP network devices. Peer BGP network devices may be established by manual configuration of the network device. In one embodiment of the invention, the network device has information about the identity of peer BGP network devices it may contact. Accordingly, the network device may contact peer BGP network devices, establish sessions with the peer BGP network devices, and subsequently gather routing information by receiving route updates from the peer BGP network devices.

In one or more embodiments of the invention, the network device may accumulate all routing information received from the peer BGP network devices in the RIB of the network device. In one embodiment of the invention, a subset of routes stored in the RIB may be suitable for ECMP routing, i.e., multiple paths that reach the same IP prefix at the same cost may exist.

Referring to the data center network (100) shown in FIG. 1, consider a scenario where computing device A (102A) needs to communicate with a remote destination network device located in one of the other networks (106), In the example network shown in FIG. 1 this communication requires packets issued from computing device A (102A) to pass through at least leaf network device A (108A) and the border leaf network device (110). However, multiple redundant paths exist between the leaf network device A (108A) and the border leaf network device (110). Assuming that the data center network (100) in the example shown in FIG. 1 includes 32 spine network devices (114A-114N) and that leaf network device A (108A) is directly connected to each of the 32 spine network devices, 32 redundant paths exist between the leaf network device (108A) and the border leaf network device (110). Embodiments of the invention may be used to efficiently create OA ECMP group that includes the 32 paths.

ECMP routes may be used to increase the bandwidth for data packets directed to the same IP prefix and/or to provide redundant paths to the same IP prefix. If the network device detects routes in the RIB that qualify for ECMP routing, the network device may collect these routes in an ECMP queue, and subsequently process the routes in preparation for writing the routes to the FIB. The detection, queuing and processing of ECMP routes is described in detail below, with reference to FIG. 5.

The processing, and writing to the FIB of ECMP routes may depend on the availability of suitable routes stored in the RIB. Additional routes may become available in the RIB as the peer BGP network devices are providing route updates to the network device. Accordingly, the content of the RIB may continuously change. The routes qualifying for ECMP routing may therefore change as well while route updates are being received. In one or more embodiments of the invention, the network device may therefore defer the processing, and writing of ECMP routes until sufficient route updates have been received from the peer network devices, as further described below with reference to FIGS. 3-7, thereby avoiding potentially repetitive processing of ECMP routes.

FIGS. 3-7 show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 3-7 may be performed in parallel with any other steps shown in FIGS. 3-7 without departing from the invention.

Figure 3:
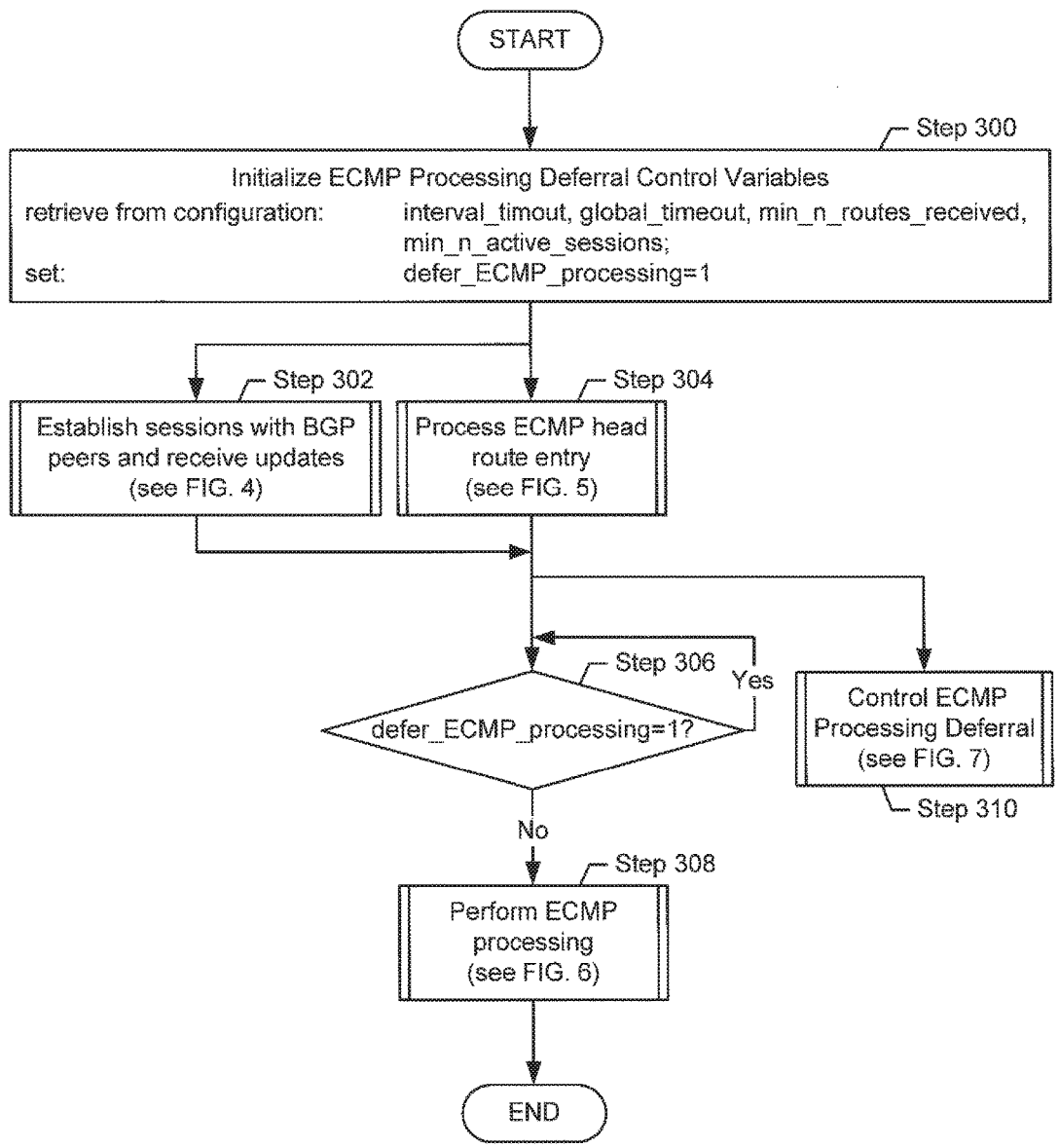
FIG. 3 shows a flowchart in accordance with one or more embodiments of the invention.

FIG. 3 shows a method for programming equal-cost multi-path (ECMP) routes on a network device. The method shown in FIG. 3 may be executed each time the BGP protocol on the network device (re-)converges. Reasons for BGP (re-)convergence may be, for example, the restart of the BGP protocol, the booting or re-booting of the network device, runtime changes of the hardware such as the replacement of a line card, etc. In one embodiment of the invention, the gateway protocol used for exchanging routing and reachability information is BGP. Those skilled in the art will appreciate that the invention is not limited to BGP. Any gateway protocol suitable for the exchange of routing and/or reachability information may be used w addition or in place of BGP.

Turning to FIG. 3, in Step 300, a set of constants and variables, subsequently used during the execution of the methods described in FIGS. 4-7. is initialized. In one embodiment of the invention, interval_timeout, global_timeout, min_n_routes_received, and min_n_active_sessions are constants that are initialized with user-configurable values. The user-configurable values may have been stored in a configuration database of the network device, and may be retrieved in Step 300 in order to initialize these constant. interval_timeout and global_timeout may be used to limit the time during which the processing of ECMP routes is deferred, in one embodiment of the invention, defer_ECMP_processing is a flag that is initialized to defer_ECMP_processing=0. The defer_ECMP_processing flag may be used as a state variable that controls whether the processing of ECMP routes is blocked (i.e., deferred) or allowed. defer_ECMP_processing=0 indicates that the processing of ECMP routes is not deferred, i.e., ECMP routes may be processed immediately. However, in scenarios where bursts of routes that may include potential ECMP routes are received from one or more peer network devices, defer_ECMP_processing may be changed to "1," thus indicating that the processing of ECMP routes is deferred, as further described below. The use of the above-Mentioned constants and variables is described in detail in the following paragraphs, with reference to FIGS. 4-7.

Steps 302-310, describe a method for programming ECMP routes on the network device, in accordance with one or more embodiments of the invention. While the network device receives route updates from BGP peer network devices (Step 302, FIG. 4), the network device may process a limited set of routes without delay (Step 304, FIG. 5). Subsequently, the network device may defer the processing of ECMP routes (Step 306). Eventually, once the ECMP deferral control process (Step 310, FIG. 7) allows the processing of the ECMP routes, the network device may process the ECMP routes (Step 308, FIG. 6). The sequentially executed Steps 304-308 may be performed in parallel with Step 302, whereas Step 310 may be executed in parallel with Step 306.

In Step 302, BGP sessions are established between the network device and peer BGP network devices. The establishment of BGP sessions may be triggered, for example, by the BGP protocol starting or re-starting on the network device, or a link (i.e., a network connection) or multiple links to peer network devices becoming available, for example, after a line card Was exchanged. The establishment of a BGP session may be initiated by the network device or by a peer network device. In one embodiment of the invention, once a BGP session with a peer BGP network device is established, the network device may receive information about network topology and routes from the peer BGP network device. The method described by Step 302 may be executed separately for each BGP session the network device has with a peer BGP network device. For example, if ten peer network devices are available for BGP peering, ten separate instances of Step 302 may exist. The execution of Step 302 for one peer network device may be independent from the execution of Step 302 for another peer network device. For example, the execution of Step 302 for one peer network device may be initiated soon after the BGP protocol becomes available on the network device, whereas the execution of Step 302 for another peer network device may be delayed, for example, because the other peer network device is not immediately responsive. Further, Step 302, executed for one peer network device, may terminate earlier than the execution of Step 302 for another peer network device, for example, because one peer network device has fewer updates to provide than the other peer network device. The details of Step 302 are described in FIG. 4.

In Step 304, executing in parallel with Step 302, routes, i.e., single routes rather than groups of ECMP routes are processed, in accordance with one or more embodiments of the invention. Processing the routes may include writing the routes to the forwarding information base (FIB) of the network device. Unlike the ECMP processing described of Step 308, the processing of the routes is not deferred, thereby making single routes for a set of destination IP prefixes available, without delay. The details of Step 304 are described in FIG. 5.

In Step 306, executing in parallel with Step 302, a determination is made about whether the defer_ECMP_processing flag is "1". In one embodiment of the invention, defer_ECMP_processing=1 indicates that the ECMP processing is to be deferred. Accordingly, if defer_ECMP_processing=1, the method may return to Step 306. If a determination is made that defer_ECMP_processing=0, the method may proceed to Step 308.

In Step 308, which may be executing in parallel with Step 302, the network device performs the ECMP processing that may prepare the network device fix using ECMP routes for forwarding an incoming data packet, received by the network device, toward the packet's destination via an ECMP route. The ECMP processing may include writing the ECMP routes to the FIB of the network device. The details of Step 306 are described in FIG. 6.

Figure 4:
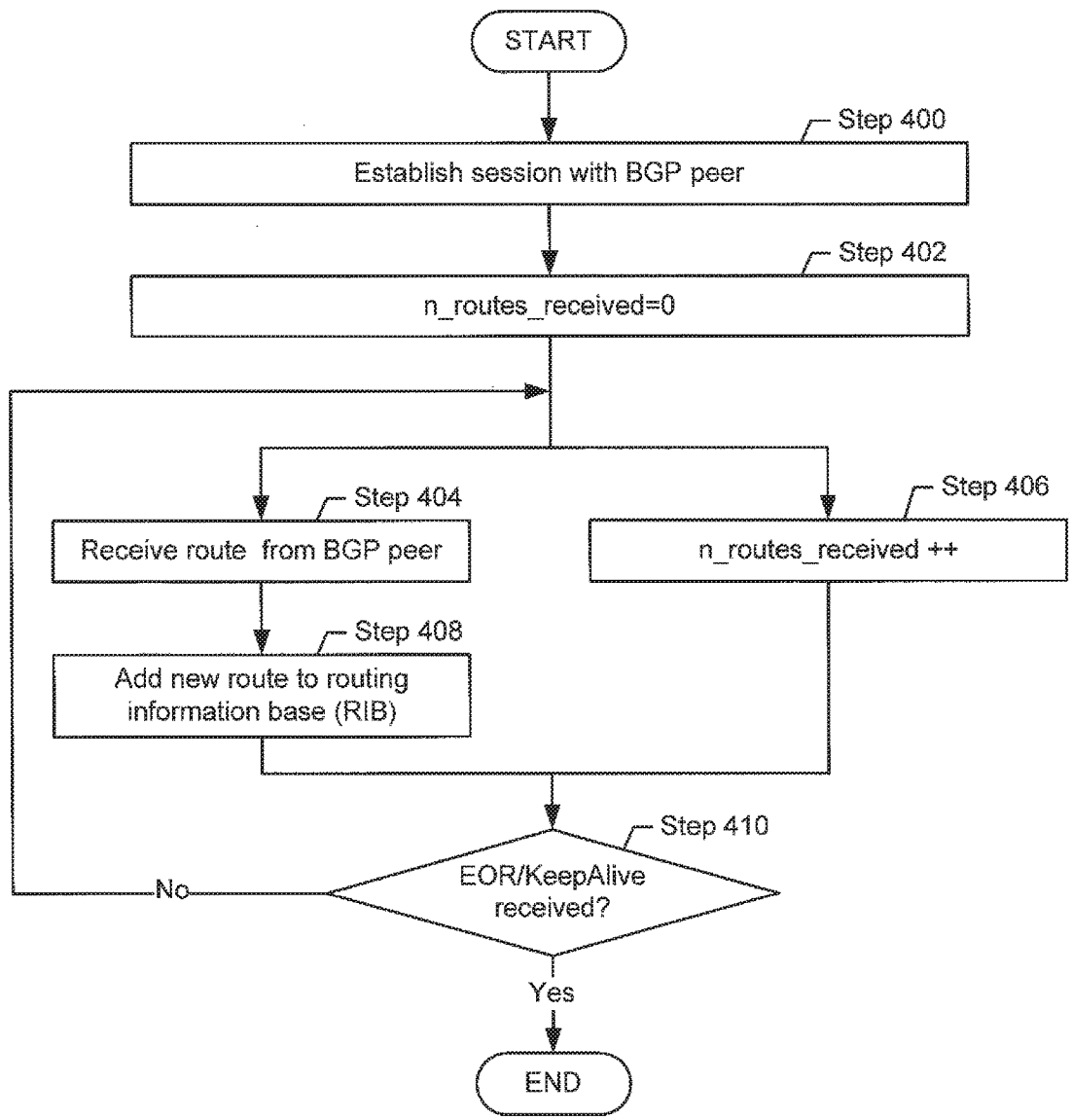
FIG. 4 shows a flowchart in accordance with one or more embodiments of the invention.

In Step 310, executing in parallel with Step 306 and 302, the network device monitors the receipt of updates, by the network device, from the peer network devices, as described in Step 302 and FIG. 4. Based on the updates received, the method of Step 310 may determine whether sufficient updates have been received. If the method of Step 310 determines that sufficient updates have been received, it may set the defer_ECMP_processing flag to "0", thereby enabling the processing of the ECMP routes, as described in Step 308 and FIG. 6. The details of Step 310 are described in FIG. 7.

FIG. 4 shows a method for tracking established BGP sessions and for tracking the receipt of route updates. The method described in FIG. 4 may be executed separately for each peer network device available for peering with the network device.

Turning to FIG. 4, in Step 400, a BGP session is established with a peer BGP network device. The establishment of the BGP session may be initiated by either the network device or the peer network device. The network device (or the peer network device) sends a transmission control protocol (TCP) request to the peer BGP network device (the network device). If the peer BGP network device (the network device) receives the TCP request, it responds and a TCP connection between the network device and the peer BGP network device is established. Next, the network device and the peer network device exchange a BGP OPEN message to establish a BGP session. The OPEN message is used for identification of the network device and for negotiation of BGP session parameters, e.g., a device may indicate that it is EOR-sending-capable. Subsequently, the peer network device may begin sending route updates to the network device.

In Step 402, the n_routes_received variable is initialized to "0". In one embodiment of the invention, n_routes_received tracks the number of routes received while a BGP session with a peer network device is active. In one embodiment of the invention, n_routes_received is a variable that is specific to an active session with a particular peer network device. Accordingly, each execution of the method described in FIG. 4 separately generates and maintains n_routes_received, thereby separately tracking the number of routes received from a particular peer network device in an active session with the peer network device.

In Step 404, the network device receives a route as part of the route update from the peer network device. A route update may include any number of routes sent by the peer network device to the network device. The transmission of a complete route update from the peer network device to the network device may be near instantaneous, or it may take a variable amount of time, depending on the number of routes to be transmitted as part of the route update, network bandwidth, and/or other potentially limiting factors.

In Step 406, executed in parallel with Step 404, n_routes_received is incremented by "1" for the route received in Step 404. As previously noted, a separate n_routes_received variable that may be independently incremented when routes are received exists for each active BGP session between the network device and a peer network device. In Step 408, the received route is added to the routing information base (RIB) of the network device.

In Step 410, a determination is made about whether an EOR marker or a KeepAlive has been received from the peer network device. In one embodiment of the invention, an EOR marker of a KeepAlive marker indicates that the transmission of the route update is complete. In one embodiment of the invention, EOR-sending-capable peer BGP network devices may terminate a route update with an "end of routing information base" (EOR) marker (see e.g., IETF document RFC 4271 for a description). EOR-sending-capable devices may be, for example, devices that support "graceful restart" or the "graceful restart" helper mode. "Graceful restart" and graceful restart helper mode are mechanisms that eliminate the need for routing protocol re-convergence under certain conditions, and are supported by certain network devices. Other peer BGP network devices may not be EOR-sending-capable. Such peer BGP network devices may send a route update without a subsequent EOR marker. In such peer network devices the end of a route update may be detected when the first KeepAlive marker after the transmission of the route update is received. BGP may use periodically exchanged KeepAlive markers to confirm that a peer network device is still connected to the network device. A KeepAlive marker, however, may not be sent by the peer BGP network device immediately after the route update, thus potentially causing a delay in the detection of a completed route update. Some network devices may be configurable to send "expedited KeepAlive markers" immediately after transmission of the route update, thus not causing a delay in the detection of a completed route update. If a determination is made that an EOR marker or a KeepAlive marker has not been received, the method may return to Steps 404 and 406 in order to receive additional routes. If a determination is made that an EOR marker or a KeepAlive marker has been received, the route update is complete, and the method may therefore proceed to Step 414.

Figure 5:
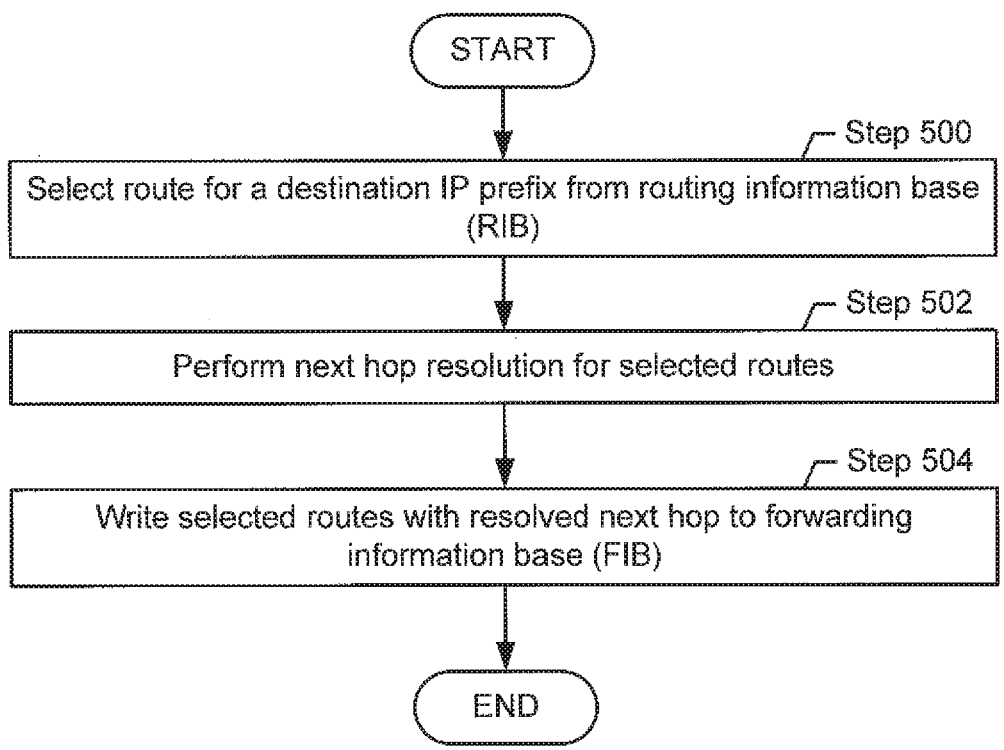
FIG. 5 shows a flowchart in accordance with one or more embodiments of the invention.

FIG. 5 shows a method for processing routes, in accordance with one or more embodiments of the invention. Unlike the ECMP processing described in FIG. 6, the processing of the routes in FIG. 5 is not deferred, thereby making an initial set of routes available without delay, thus enabling the network device to process and forward incoming data packets using these initial mutes. The method described in FIG. 5 may be repeated until a route for some (or all) of the destination IP prefixes has been processed.

Turning to FIG. 5, in Step 500, the network device obtains a route for a destination IP prefix. This route may have been pre-programmed into the network device. In Step 502, a next bop is resolved for route obtained in Step 500.

In Step 504, the route selected in Step 500 with the next hop resolved in Step 502, is written to the forwarding information base (FIB). More specifically, a new FIB entry is created that includes the destination IP prefix and a forward equivalence class (FEC) index. In addition, a new FEC entry corresponding to the aforementioned FEC index is generated and stored in the FEC table (also located in the data plane). The FEC entry may include information necessary for a network device to forward an incoming packet toward the packets destination. Accordingly, a FEC entry may be a tuple of forwarding information that may include a next hop and an egress port that connects to the next hop. In one embodiment of the invention, the route, written to the FIB, enables the network device to process an incoming packet that is directed to an IP address that matches the destination IP prefix.

Figure 6:
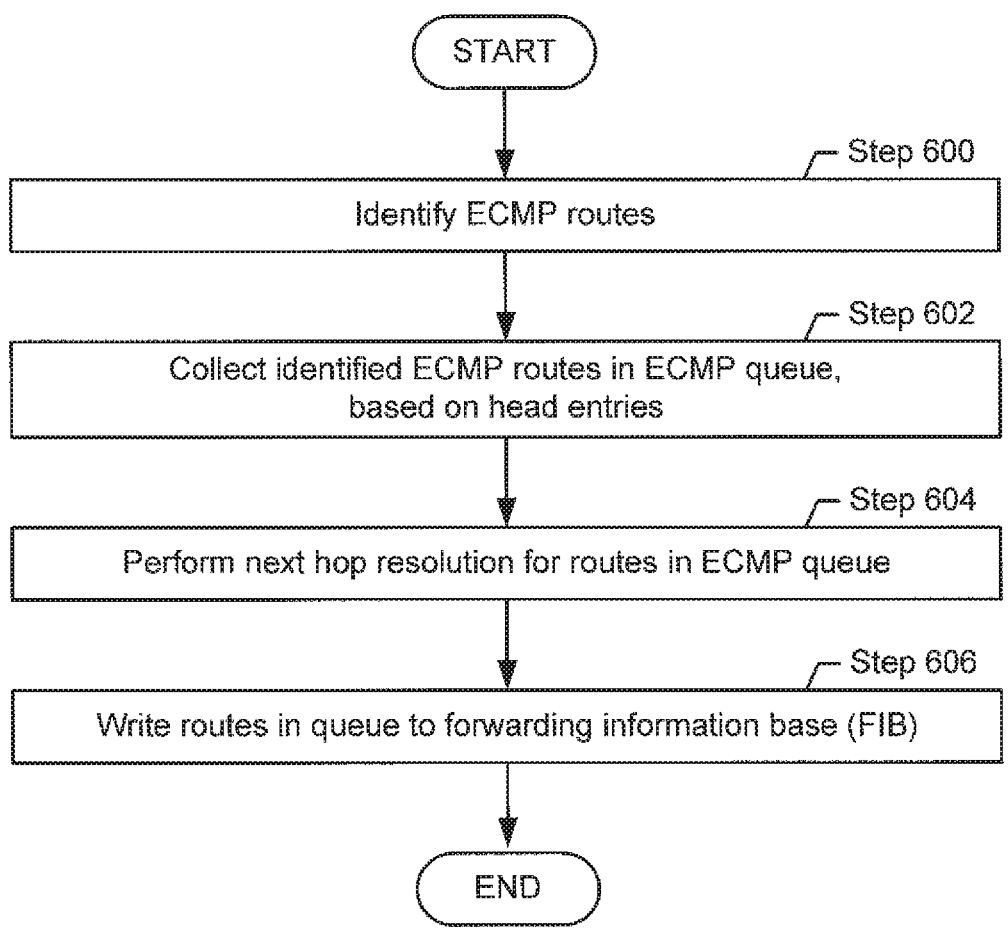
FIG. 6 shows a flowchart in accordance with one or more embodiments of the invention.

FIG. 6 shows a method for processing ECMP routes, in accordance with one or more embodiments of the invention. In accordance with one embodiment of the invention, the processing of the ECMP routes may he deferred based on a set of heuristics described in detail below, with reference to FIG. 7. Once the method described in FIG. 6 is executed, all routes received using the method described in FIG. 4 may be analyzed for ECMP route candidates in order to form destination IP prefix-specific ECMP groups of routes that may subsequently be written to the FIB.

Turning to FIG. 6, in Step 600, the network device searches the RIB for routes suitable for ECMP routing. In one embodiment of the invention, candidate ECMP routes are identified Separately for each destination IP prefix. In one embodiment of the invention, routes with the lowest cost (or any other metric being used for best path selection) per destination IP prefix are selected, as previously described with reference to FIG. 5.

In Step 602, the candidate ECMP routes, identified in Step 600, are grouped based on their destination IP prefixes. For each destination IP prefix, one of the routes identified in Step 600 may become an ECMP head route. The selected ECMP head route for a given destination IP prefix may be the same route as previously associated with the destination IP prefix programmed into the FIB in FIG. 5. Alternatively, the new ECMP head route may be a different route, for example, if a lower cost is associated with the new ECMP head route. All remaining routes, identified in Step 600, may be associated with the appropriate ECMP head route, based on the destination IP prefix, using pointers. In one embodiment of the invention, only routes whose associated cost and/or other metrics, e.g. the next hop, are identical may be associated with an ECMP head route. Each route for a particular destination IP prefix may have a pointer directed to the ECMP head route for the same destination IP prefix. In one embodiment of the invention, the ECMP head route-pointer construct enables streamlined route processing.

In Step 604, the network device performs next hop resolutions for the routes collected in Step 602. In one embodiment of the invention, the next hops for all routes identified in Step 600 are resolved.

In Step 606, the network device writes the routes collected in Step 602, with the next hops resolved in Step 604, to the FIB of the network device. More specifically, a single FIB entry is created in the FIB for each destination IP prefix, where each FIB entry includes a FEC index. The FEC index corresponds to a FEC entry in a FEC table, where the corresponding entry includes a set of tuples. Each tuple in the set of topics includes the destination IP prefix, a next hop, and an egress port that connects to the next hop (as determined in step 604).

Figure 7:
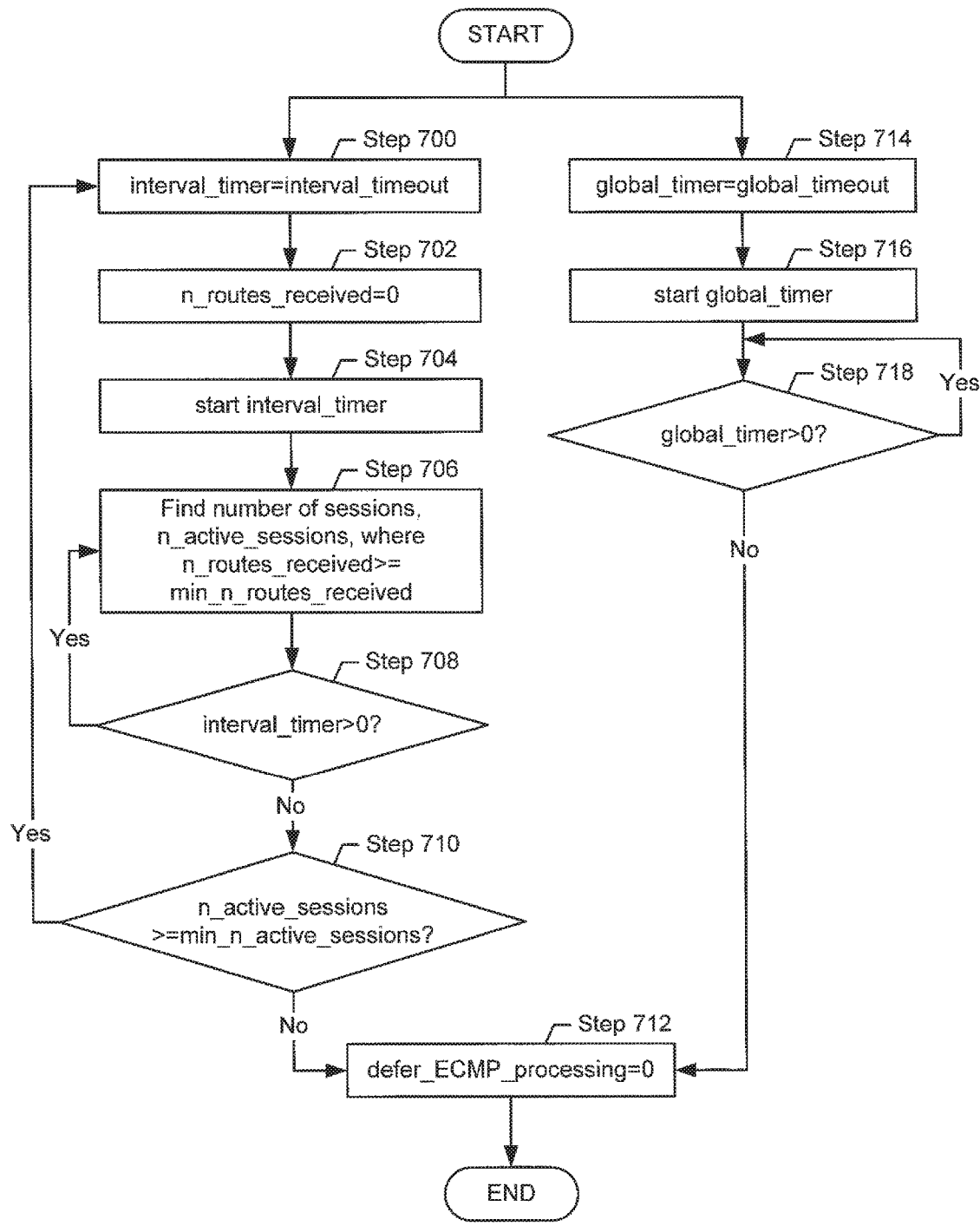
FIG. 7 shows a flowchart in accordance with one or more embodiments of the invention.

FIG. 7 shows a method for controlling the deferral of the processing of ECMP routes, in accordance with one or more embodiments of the invention. A decision about the deferral of the processing of ECMP routes is made based on the updates received from the peer network devices (Steps 700-710), as follows. The number of updates received during a configurable time interval (i.e., a route update rate) may be monitored, separately for each BGP session the network device has with a peer BGP network device. If a configurable minimum number of active sessions do not provide an update rate above a configurable threshold, the network device may stop deferring the processing of ECMP routes. A decision about the deferral of the processing of ECMP routes is further made based on an additional timer that ensures that the processing of ECMP routes is riot deferred beyond a configurable maximum deferral time (Steps 714-718), even if a sufficient number of peer network devices continuously provide updates at a high rate. Both the update rate criterion and the maximum deferral time criterion may independently terminate the deferral of the processing of ECMP routes.

Turning to FIG. 7, in Step 700, a timer, interval_timer, is initialized to a user-configurable value, interval_timeout. In one embodiment of the invention, interval_timer is a downward-counting timer that determines a time window during which the number of routes received from a peer network device is counted, thereby enabling the determination of a route update rate. The default setting for interval_timeout may be, for example, 1 second.

In Step 702, the n_routes_received variable is reset to "0". n_routes_received may be used to track the number of routes received while a BGP session with a peer network device is active. As previously noted, n_routes_received may be a variable that is specific to a BGP session with a particular peer network device. Accordingly, a separate n_routes_received variable may be maintained for each BGP session whose execution is being tracked by the method described in FIG. 4. The reset of n_routes_received in Step 702 may apply to all n_routes_received variables for all BGP sessions being tracked.

In Step 704, the timer, interval_timer, is started. The interval_timer may be started when a first update message is received by the first established BGP session. The interval_timer may further be restarted if a newly established BGP session that provides potential ECMP routes becomes available. In one embodiment of the invention, the interval timer may be restarted even after the processing of the ECMP routes is no longer deferred. In such a case, the defer_ECMP_processing state is also reset to "1", thus re-activating the deferral of the ECMP route processing for the newly received routes. In Step 706, the number of active BGP sessions, n_active_sessions, is determined. n_active_sessions is determined by comparing the number of routes received, n_routes_received, to a user-configurable minimum number of routes received, min_n_routes received, for each BGP session the network device may have with peer network. devices. The default value for the minimum number of routes received may be, for example, 1,000 routes. If n_routes_received is equal to or exceeds min_n_routes_received, the BGP session may count toward n_active_sessions.

In Step 708, a determination is made about whether the timer, interval_timer, has expired. If the timer has not expired, the method may return to Step 706. If the timer has expired, the method may proceed to Step 710.

In Step 710, a determination is made about whether, at the time when the timer, interval_timer, has expired, the number of active sessions, n_active_sessions, was greater than or equal to a user-configurable minimum number of active sessions, min_n_active_sessions. The default number of minimum active sessions may be, for example, two sessions. If a determination is made that the number of active sessions is greater than or equal to the minimum number of active sessions, the method may return to Step 700. If a determination is made that the number of active sessions is less than the minimum number of active sessions, the method may proceed to Step 712.

In Step 712, defer_ECMP_processing is set to "0", thereby allowing the processing of the ECMP routes in Step 308 of FIG. 3.

As previously noted, in parallel to the number of active sessions being tracked in Steps 700-710, a timer, designed to limit the maximum time the ECMP route processing may be deferred, may be monitored in Steps 714-718.

In Step 714, a tinier, global_timer, is initialized to a user-configurable value, global_timeout. In one embodiment of the invention, global_timer is a downward-counting timer that determines a duration after which the processing of the ECMP routes may be allowed, regardless of whether a sufficient number of BGP sessions with a sufficient route update rates exists. The default setting for global_timeout may be, for example, 10 seconds.

In Step 716, the timer, global_timer, is started. The global_timer may be started when a first update message is received by the first established BGP session. The global_timer may further be restarted if a newly established BGP session that provides potential ECMP routes becomes available. In one embodiment of the invention, the global_timer may be restarted even after the processing of the ECMP routes is no longer deferred. As previously noted, in such a case, the defer_ECMP_processing state is also reset to "1", thus re-activating the deferral of the ECMP route processing for the newly received routes. In Step 718, a determination is made about whether the timer, global_timer has expired. If the timer has not expired, the method may return to Step 718. If the timer has expired, the method may proceed to Step 712.

In Step 712, defer_ECMP_processing is set to "0", thereby allowing the processing of the ECMP routes in Step 308 of FIG. 3.

Embodiments of the invention may enable a network device to efficiently identify and prepare routes for ECMP routing. Rather than repeatedly selecting candidate ECMP routes as they are received from peer network devices providing route updates, and incrementally resolving the next hops for the selected candidate ECMP routes, the identification and processing of ECMP routes may be deferred until a sufficient number of routes has been received from the peer network devices. Deferring the identification and processing of ECMP routes may enable the network device to avoid computational expensive operations that may result from, for example, (a) discarding of candidate ECMP routes arid identification of a new set of candidate ECMP routes whenever an alternative route having a lower cost than the current set of ECMP routes becomes available; (b) redundant processing of identical routes received from different peer network devices; (c) repeated resolution of next hops; and (d) repeatedly updating of the forwarding information base (FIB) with the latest set of ECMP routes. Further, even though embodiments of the invention may defer the writing of ECMP routes to the FIB, an initial set of routes for all known destination IP prefixes may immediately be written to the FIB, thereby ensuring that an incoming data packet, received by the network device, may be routed, rather than being dropped.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for configuring a network device, comprising:
    setting a defer equal-cost multi-path (ECMP) variable to a first value;
    setting a first timer to a user-configurable time value;
    setting a routes received variable to zero;
    starting the first timer;
    receiving a plurality of routes while the first timer performs a countdown of the user-configurable time value to obtain an increased routes received variable;
    determining a number of received routes using the increased routes received variable;
    determining that the number of received routes exceeds a user-configurable minimum number of routes in order to discover that an active session exists;
    determining that the first timer has reached zero;
    determining, based on the first timer reaching completing the countdown and the existence of the active session, that a user-configurable minimum number of active sessions is not exceeded;
    setting, based on the user-configurable minimum number of active sessions not being exceeded, the defer ECMP variable to a second value;
    after setting the defer ECMP variable to the second value, identifying, in a routing information base (RIB) of the network device, a set of ECMP routes from a plurality of routes for a destination IP prefix; and
    updating a forwarding information base (FIB) of the network device based on the set of ECMP routes.

2. The method of claim 1, further comprising:
    before determining a number of received routes using the increased routes received variable,
        determining that a global timer has finished a countdown; and
        based on determining that the global timer has finished the countdown, setting the defer ECMP variable to the second value.

3. The method of claim 1, further comprising:
    re-setting the defer equal-cost multi-path (ECMP) variable to the first value;
    re-setting the first timer to the user-configurable time value;
    re-setting the routes received variable to zero;
    re-starting the first timer;
    receiving a second plurality of routes while the first timer performs a second countdown of the user-configurable time value to obtain a second increased routes received variable;
    determining a second number of received routes using the second increased routes received variable;
    determining that the second number of received routes exceeds the user-configurable minimum number of routes in order to discover that a plurality of active sessions exist;
    determining that the first timer has reached zero;
    determining, based on the first timer reaching completing the countdown and the existence of the plurality of active sessions, that the user-configurable minimum number of active sessions is exceeded; and
    keeping, based on the user-configurable minimum number of active sessions being exceeded, the defer ECMP variable at the first value.

4. The method of claim 1, wherein the routes received variable tracks the number of routes received within the user-configurable time value.

5. The method of claim 1, further comprising:
    before updating the FIB, processing the set of ECMP routes for the destination IP prefix, wherein processing the set of ECMP routes comprises:
        selecting a route from the set of ECMP routes for the destination IP prefix as an ECMP head route, and
        directing, using pointers, a set of remaining routes from the set of ECMP routes to the ECMP head route.

6. The method of claim 1, wherein the first timer is started when a first update message is received from an established border gateway protocol (BGP) session.

7. A non-transitory computer readable medium comprising instructions which, when executed, perform a method for configuring a network device, the method comprising:
    setting a defer equal-cost multi-path (ECMP) variable to a first value;
    setting a first timer to a user-configurable time value;
    setting a routes received variable to zero;
    starting the first timer;
    receiving a plurality of routes while the first timer performs a countdown of the user-configurable time value to obtain an increased routes received variable;
    determining a number of received routes using the increased routes received variable;
    determining that the number of received routes exceeds a user-configurable minimum number of routes in order to discover that an active session exists;
    determining that the first timer has reached zero;
    determining, based on the first timer reaching completing the countdown and the existence of the active session, that a user-configurable minimum number of active sessions is not exceeded;
    setting, based on the user-configurable minimum number of active sessions not being exceeded, the defer ECMP variable to a second value;
    after setting the defer ECMP variable to the second value, identifying, in a routing information base (RIB) of the network device, a set of ECMP routes from a plurality of routes for a destination IP prefix; and
    updating a forwarding information base (FIB) of the network device based on the set of ECMP routes.

8. The non-transitory computer readable medium of claim 7, wherein the method performed by execution of the instructions further comprises:
    before determining a number of received routes using the increased routes received variable,
        determining that a global timer has finished a countdown; and
        based on determining that the global timer has finished the countdown, setting the defer ECMP variable to the second value.

9. The non-transitory computer readable medium of claim 7, wherein the method performed by execution of the instructions further comprises:
  re-setting the defer equal-cost multi-path (ECMP) variable to the first value;
  re-setting the first timer to the user-configurable time value;
  re-setting the routes received variable to zero;
  re-starting the first timer;
  receiving a second plurality of routes while the first timer performs a second countdown of the user-configurable time value to obtain a second increased routes received variable;
  determining a second number of received routes using the second increased routes received variable;
  determining that the second number of received routes exceeds the user-configurable minimum number of routes in order to discover that a plurality of active sessions exist;
  determining that the first timer has reached zero;
  determining, based on the first timer reaching completing the countdown and the existence of the plurality of active sessions, that the user-configurable minimum number of active sessions is exceeded; and
  keeping, based on the user-configurable minimum number of active sessions being exceeded, the defer ECMP variable at the first value.

10. The non-transitory computer readable medium of claim 7, wherein the routes received variable tracks the number of routes received within the user-configurable time value.

11. The non-transitory computer readable medium of claim 7, wherein the method performed by execution of the instructions further comprises:
  processing the set of ECMP routes for the destination IP prefix, wherein processing the set of ECMP routes comprises:
    before updating the FIB, selecting a route from the set of ECMP routes for the destination IP prefix as an ECMP head route,
    directing, using pointers, a set of remaining routes from the set of ECMP routes to the ECMP head route.

12. The method of claim 2, wherein the first timer is started when a first update message is received from an established border gateway protocol (BGP) session.

13. A network device, comprising:
  a routing information base (RIB);
  a forwarding information base (FIB); and
  a processor coupled to memory and operatively connected to the RIB and the FIB, and configured to:
    set a defer equal-cost multi-path (ECMP) variable to a first value;
    set a first timer to a user-configurable time value;
    set a routes received variable to zero;
    start the first timer;
    receive a plurality of routes while the first timer performs a countdown of the user-configurable time value to obtain an increased routes received variable;
    determine a number of received routes using the increased routes received variable;
    determine that the number of received routes exceeds a user-configurable minimum number of routes in order to discover that an active session exists;
    determine that the first timer has reached zero;
    determine, based on the first timer reaching completing the countdown and the existence of the active session, that a user-configurable minimum number of active sessions is not exceeded;
    set, based on the user-configurable minimum number of active sessions not being exceeded, the defer ECMP variable to a second value;
    after setting the defer ECMP variable to the second value, identify in the RIB a set of ECMP routes from a plurality of routes for a destination IP prefix; and
    update the FIB based on the set of ECMP routes.

14. The network device of claim 13, wherein the processor is further configured to:
  before determining a number of received routes using the increased routes received variable,
    determine that a global timer has finished a countdown; and
    set, based on determining that the global timer has finished the countdown, the defer ECMP variable to the second value.

15. The network device of claim 13, wherein the processor is further configured to:
  re-set the defer equal-cost multi-path (ECMP) variable to the first value;
  re-set the first timer to the user-configurable time value;
  re-set the routes received variable to zero;
  re-start the first timer;
  receive a second plurality of routes while the first timer performs a second countdown of the user-configurable time value to obtain a second increased routes received variable;
  determine a second number of received routes using the second increased routes received variable;
  determine that the second number of received routes exceeds the user-configurable minimum number of routes in order to discover that a plurality of active sessions exist;
  determine that the first timer has reached zero;
  determine, based on the first timer reaching completing the countdown and the existence of the plurality of active sessions, that the user-configurable minimum number of active sessions is exceeded;
  keep, based on the user-configurable minimum number of active sessions being exceeded, the defer ECMP variable to at the first value.

16. The network device of claim 13, wherein the routes received variable tracks the number of routes received within the user-configurable time value.

17. The network device of claim 13, wherein the processor is further configured to:
  process the set of ECMP routes for the destination IP prefix, wherein, to process the set of ECMP routes, the processor is further configured to:
    before updating the FIB, select a route from the set of ECMP routes for the destination IP prefix as an ECMP head route, and
    direct, using pointers, a set of remaining routes from the set of ECMP routes to the ECMP head route.

* * * * *